Aug. 17, 1937.　　　　F. MACCARONE　　　　2,090,212
SHOE AND METHOD OF MAKING SAME
Filed Jan. 6, 1936　　　　6 Sheets-Sheet 1
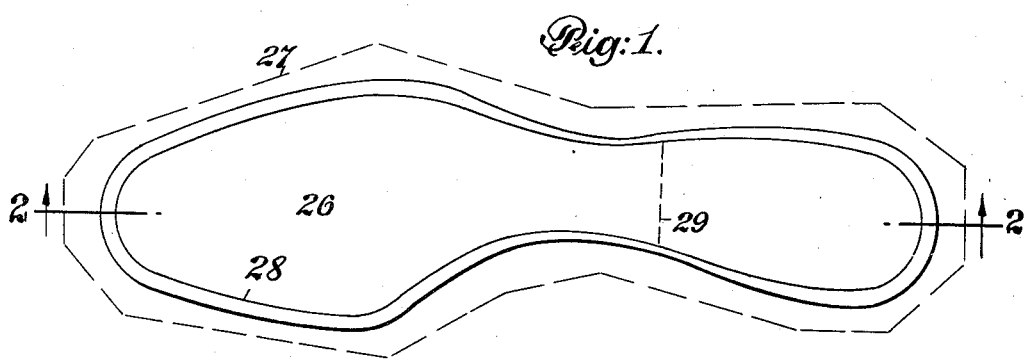
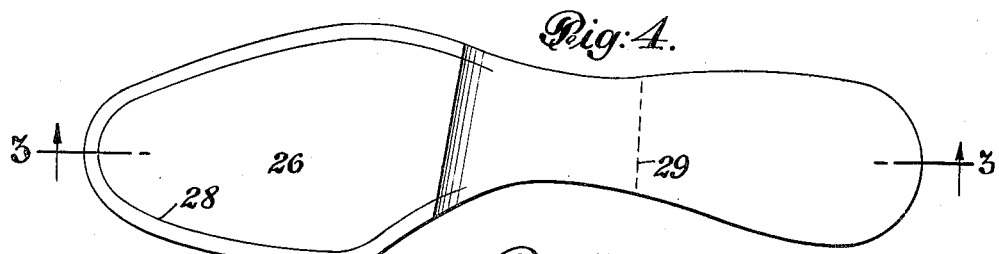
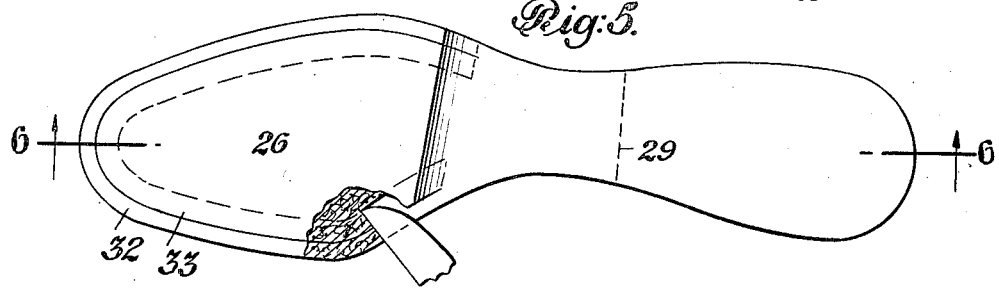
INVENTOR
Fred Maccarone
BY
ATTORNEY Aug. 17, 1937.　　　　F. MACCARONE　　　　2,090,212
SHOE AND METHOD OF MAKING SAME
Filed Jan. 6, 1936　　　6 Sheets-Sheet 2
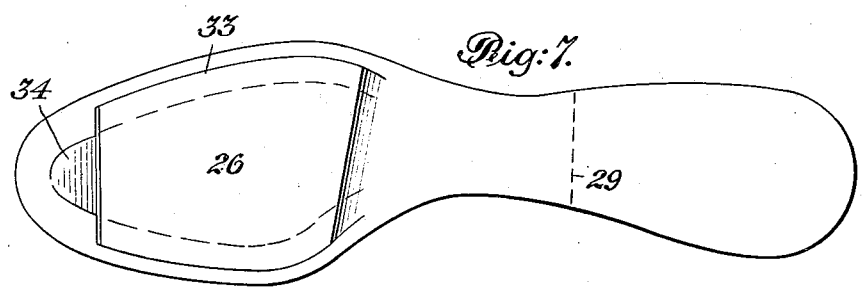
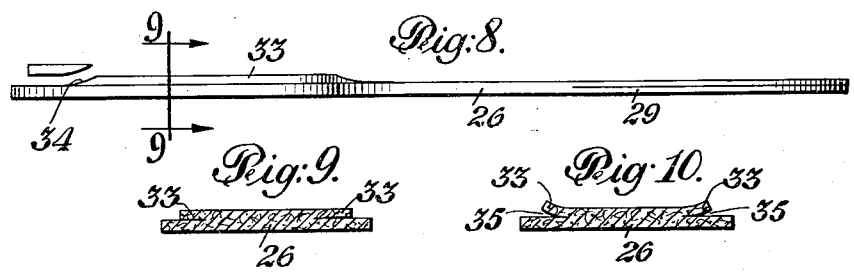
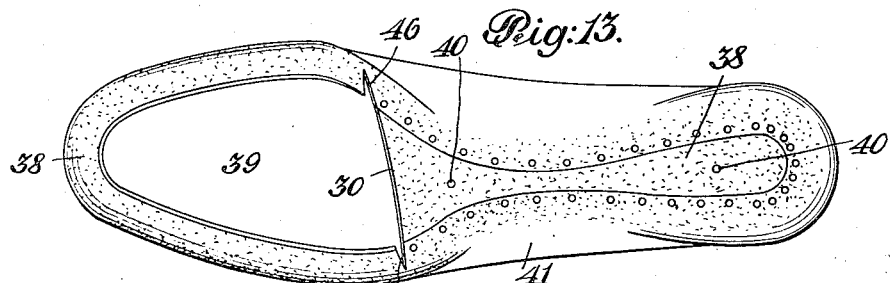
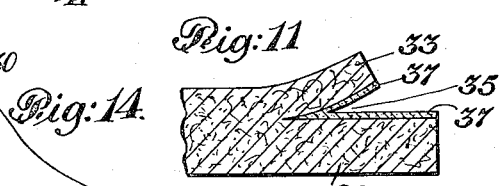
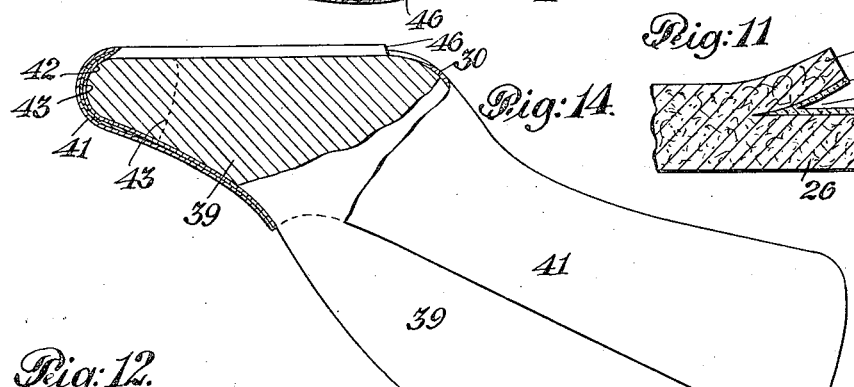
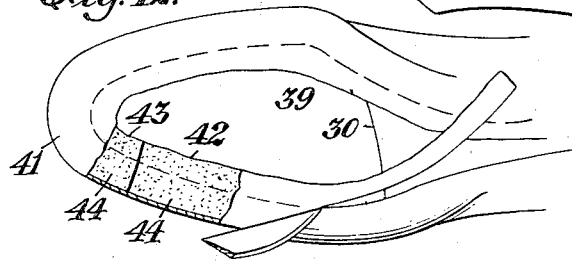
INVENTOR
*Fred Maccarone*
BY
ATTORNEY

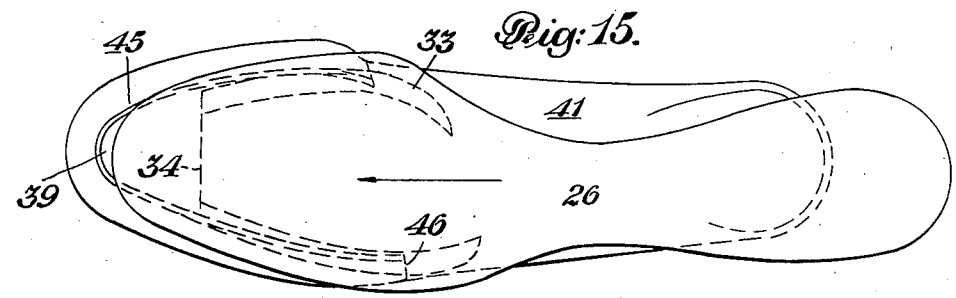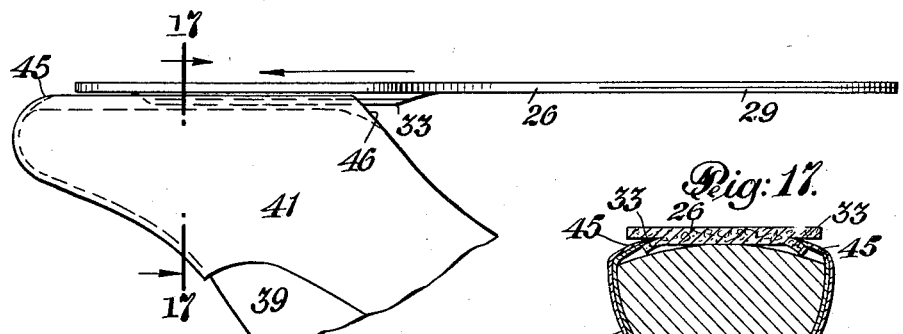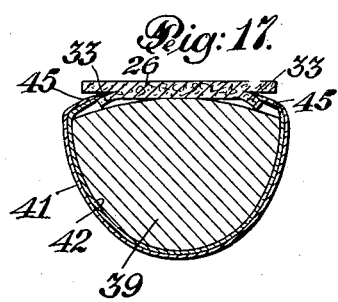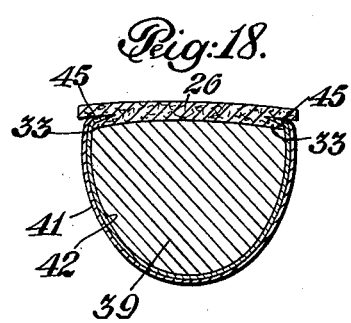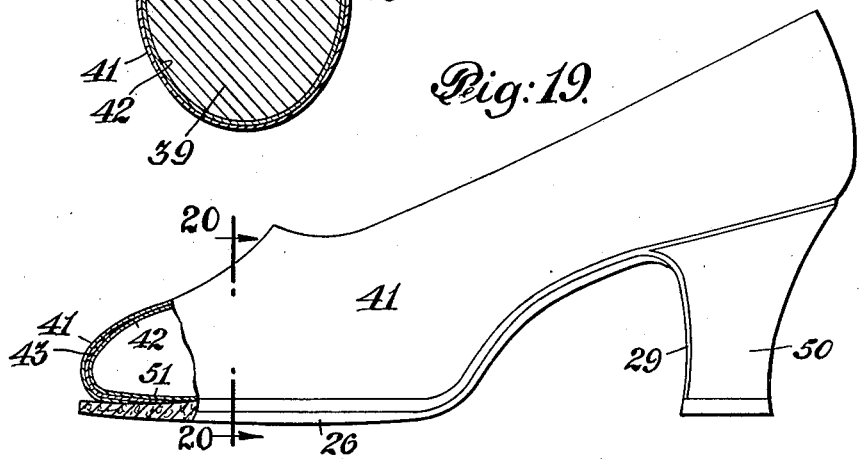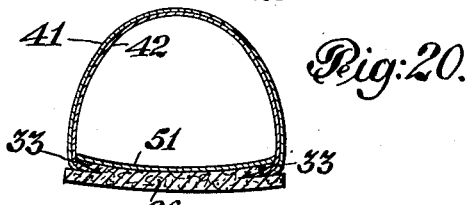

Aug. 17, 1937.  F. MACCARONE  2,090,212
SHOE AND METHOD OF MAKING SAME
Filed Jan. 6, 1936  6 Sheets-Sheet 4
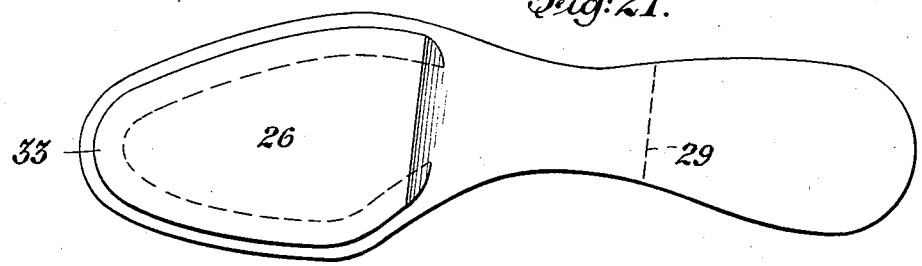
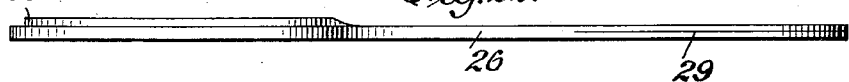
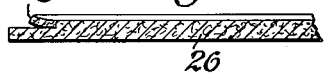
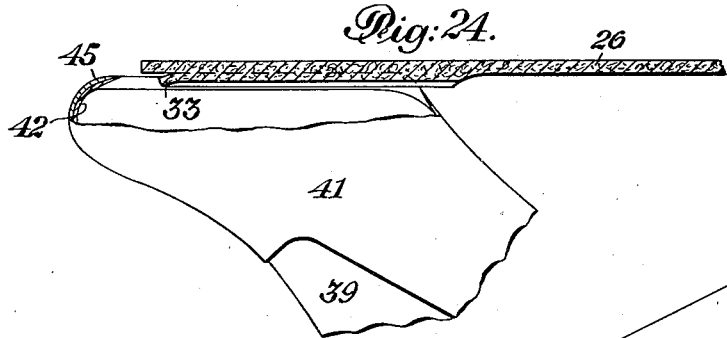
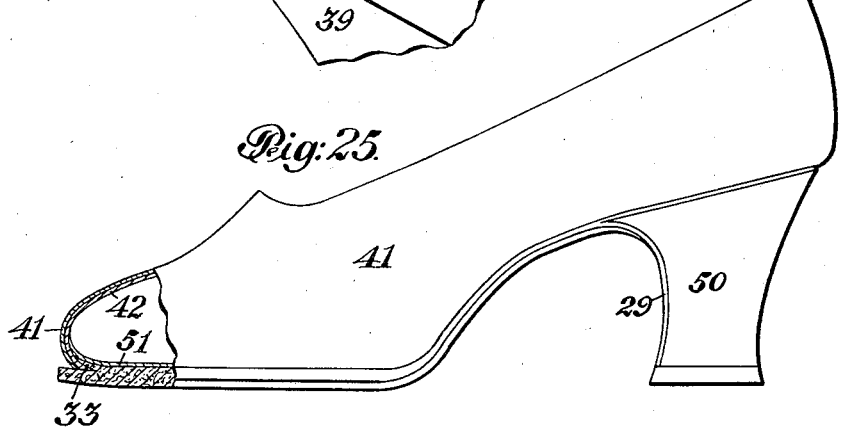
INVENTOR
*Fred Maccarone*
BY
ATTORNEY Aug. 17, 1937.　　　F. MACCARONE　　　2,090,212
SHOE AND METHOD OF MAKING SAME
Filed Jan. 6, 1936　　　6 Sheets-Sheet 5
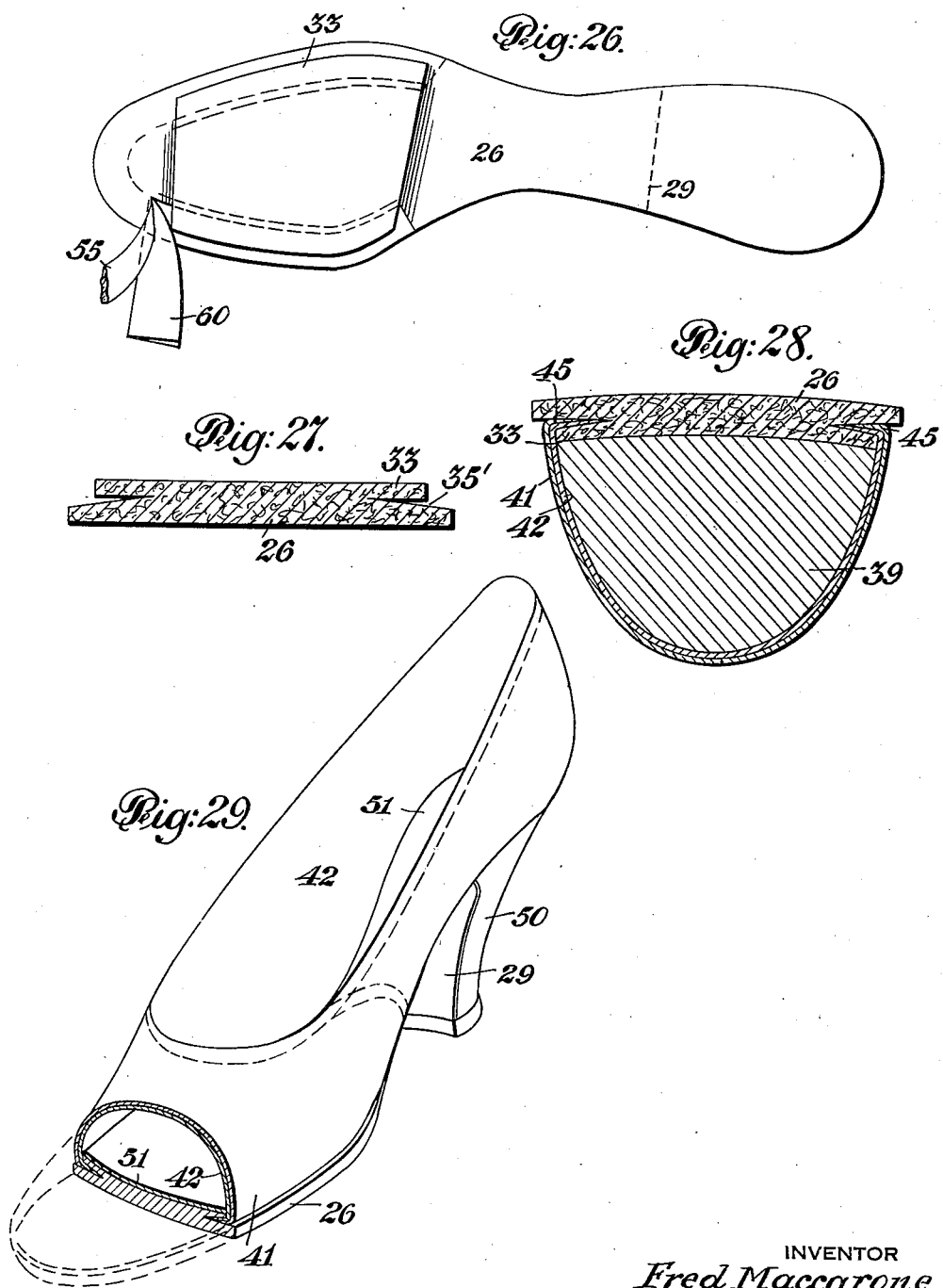
INVENTOR
Fred Maccarone
BY
ATTORNEY Aug. 17, 1937.　　　　F. MACCARONE　　　　2,090,212
SHOE AND METHOD OF MAKING SAME
Filed Jan. 6, 1936　　　　6 Sheets-Sheet 6
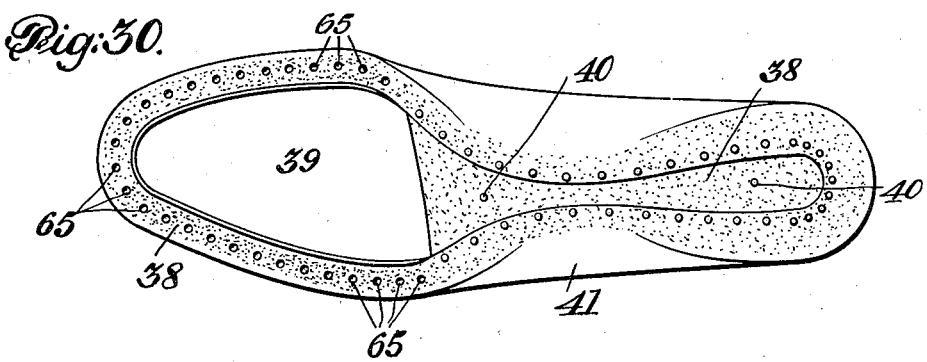
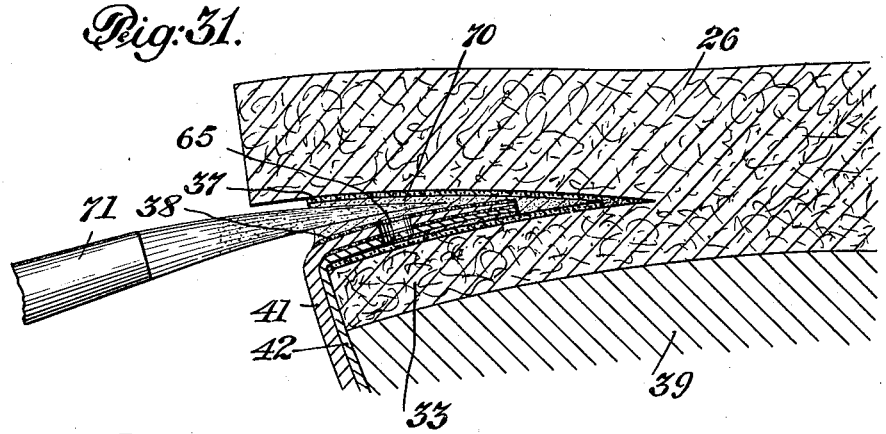
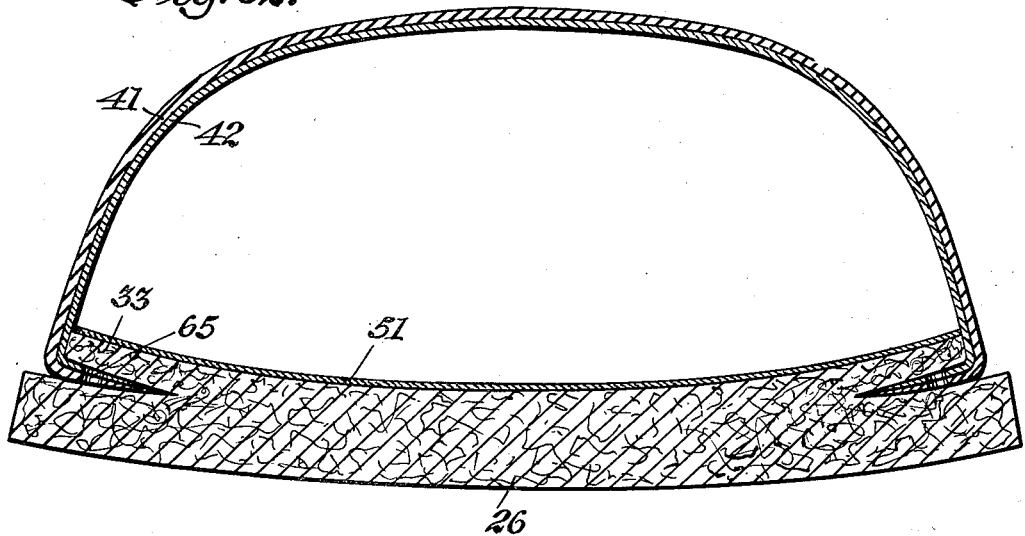
INVENTOR
*Fred Maccarone*
BY
ATTORNEY Patented Aug. 17, 1937

2,090,212

UNITED STATES PATENT OFFICE 2,090,212

SHOE AND METHOD OF MAKING SAME

Fred Maccarone, Brooklyn, N. Y., assignor to The Del-Mac Shoe Process Corporation, New York, N. Y.

Application January 6, 1936, Serial No. 57,716

14 Claims. (Cl. 12—142)

My present invention relates to shoes and shoemaking and is a continuation in part of my pending application Serial No. 44,180 filed October 9, 1935. More particularly, my invention relates to the making of single soled shoes in which the upper and sole parts are secured together by means of cement. Heretofore cemented shoes of this type, popularly denominated "single sole", have been characterized by separate skeletonized insole members to which the shoe uppers are first lasted, the outsole being subsequently attached in the manner of McKay manufacture.

A principal object of my invention is to provide an improved cemented shoe having, in fact, a single sole to which the upper is directly attached, as in a turned shoe, thereby obtaining the fitting qualities and other well known characteristics of a turned shoe. Another principal object is to provide a simple and practical method of making my improved shoe whereby it may be lasted and assembled right-side-out, thereby obviating the turning and second lasting operations ordinarily required to produce shoes having this type of single sole. Other and further objects will appear from the following specification.

Referring to the drawings:

Figure 1 is a plan view illustrating a rounded sole having incisions cut therein as described in my U. S. Patent Nos. 2,012,913 and 2,012,915 issued August 27, 1935, the sole being split at the heel portion to provide the usual heel breast flap.

Figure 2 is a longitudinal sectional view taken on line 2—2 of Figure 1.

Figure 3 is a longitudinal section similar to Figure 2 illustrating the shanking out operation.

Figure 4 is a plan view of the sole as it appears after the shank reducing operation.

Figure 5 is a plan view similar to Figure 4 and illustrates the manner in which the sole edge is reduced over the forepart and an integral leaf or lip is formed on the sole inwardly of the reduced marginal edge portion.

Figure 6 is a longitudinal sectional view taken on line 6—6 of Figure 5 showing the sole after the edge reducing and leaf forming operations have been performed, and showing the material removed from the edge margins of the forepart.

Figure 7 is a plan view of the sole showing a further reduction thereof over the toe tip portion to accommodate the reinforcing boxing of the upper.

Figure 8 is an edge elevation of the sole as shown in Figure 7.

Figure 9 is a cross sectional view taken on line 9—9 of Figure 8.

Figure 10 is a view similar to Figure 9 showing the lip or leaf portions of the sole turned up to accommodate the assembly margins of the upper and the cement used for securing the upper to the sole.

Figure 11 is a fragmental section of the sole on a larger scale than illustrated in Figure 10 and clearly shows the layers of cement applied to the under side of the leaf or lip and to the underlying marginal surface of the sole.

Figure 12 is a plan view of the forepart of a last on which a shank piece and an upper, together with its lining, have been assembled and illustrates the usual operation performed to trim the surplus overlasted portions of the upper. The lasting margin of the upper has been broken away to reveal the underlying lining and the coating of adhesive thereon by which the upper is held in its lasted position after removal of the usual lasting tacks.

Figure 13 is a plan view of the last and parts as they appear after the performance of the operation illustrated in Figure 12, and showing a coating of cement over the assembly margin of the upper, and the exposed areas of the shank piece. The view also discloses the manner in which the assembly margin of the upper is transversely cut at the forward end of the shank piece.

Figure 14 is a side elevation, partly in section, of the last and parts shown in Figure 13, the assembly allowance of the upper forward of the shank being elevated slightly from the last bottom.

Figure 15 is a plan view of the last and parts shown in Figure 14 and illustrates the assembly therewith of the sole shown in Figure 7, and Figure 16 is a side elevation thereof.

Figure 17 is a cross sectional view taken on line 17—17 of Figure 16.

Figure 18 is a cross sectional view similar to Figure 17 illustrating the sole and upper parts secured in position and conformed to the last.

Figure 19 is a side elevation of my completed shoe, the toe portion being shown in section to disclose the assembled relation of the sole and upper parts at the toe tip.

Figure 20 is a cross sectional view taken on line 20—20 of Figure 19 and discloses the assembled relation of the sole and upper parts at the ball portion of the sole.

Figure 21 is a plan view similar to Figure 7 showing the sole as it is prepared for soft toed shoes and slippers which do not require reinforcing boxing, and Figure 22 is an edge elevation thereof.

Figure 23 is a fragmental longitudinal section of the sole with the leaf or lip turned up.

Figure 24 is a side elevation of the last and the upper and sole portions in section to illustrate the assembly of the sole to the upper.

Figure 25 is a side elevation similar to Figure 19 disclosing the assembled relation of the sole and upper parts at the toe tip where no toe boxing is required.

Figure 26 is a plan view of a sole prepared as shown in Figure 7 and illustrates a further edge reducing operation.

Figure 27 is a sectional view taken on line 27—27 of Figure 26.

Figure 28 is a sectional view similar to Figure 18, but showing the modified sole construction.

Figure 29 is a perspective view of a shoe from which the toe portion has been cut away to reveal the finished relationship of the assembled parts.

Figure 30 is a plan view similar to Figure 13, showing the upper margin provided with a line of perforations about the forepart and uncut at the forward end of the shank piece.

Figure 31 is an enlarged fragmental section, greatly exaggerated, and illustrates the manner in which cement solvent may be applied to the joint after the sole has been brought into position relative to the lasted upper.

Figure 32 is a cross section on an enlarged scale taken through the ball portion of a finished shoe which has been assembled in the manner indicated in Figures 30 and 31.

In describing my invention with reference to the drawings, which are merely illustrative and not to scale, I will first describe the steps performed in preparing the single sole, that is to say the stock fitting operations. I will then describe the manner in which the upper is lasted and prepared to receive the sole, and, finally, the assembly of the sole in relation to the lasted upper.

Stock fitting operations

A sole 26 of full thickness is rounded from a blank 27 indicated in broken lines in Figure 1, a marginal incision being formed in the inner surface of the blank as indicated at 28. The incision is preferably formed as described in my U. S. Patent No. 2,012,913 of August 27, 1935, and is positioned in relation to the sole edge substantially as would be the shoulder of a conventional shoulder turned shoe. The sole may then be split to form the conventional heel breast flap 29. The sole is then reduced in thickness rearward of the ball line by removal of the shank piece 30 and marginal waste rand 31 which come off together in a conventional shanking out operation.

The next step consists in splitting the forepart of the sole inwardly from the edge in a plane corresponding with the bottom of the incision 28, as shown in Figures 5 and 6, to remove a rand 32 outwardly of the incision 28 and to form a leaf or lip 33 integral with the sole. The leaf 33 is of a breadth slightly greater than the assembly allowance of the shoe upper and its edge is substantially square as is the edge of an insole in a welt or McKay type shoe. This splitting operation may be readily performed on a standard channelling machine equipped with a straight outer knife.

Where the toe portion of the shoe upper is to be reinforced with boxing, I prefer next to remove the forward portion of the leaf and the adjacent portion of the sole at 34. (See Figures 7 and 8.) The sole may then be preconformed to approximately its ultimate arched condition, if desired, this being a usual step in preparing soles for cement attachment.

I next turn the leaf at an angle to the underlying portion of the sole, substantially to the position shown in Figure 10, thereby opening a channel 36, and apply a suitable adhesive cement 37, such as pyroxylin, to the walls of the channel thus formed and over the shank and heel portion of the sole.

Upper lasting operations

A shank piece is first secured to the bottom of a last as by temporary tacks 40. The piece 30 removed in reducing the shank portion of the sole may be economically employed for this purpose.

It will be understood that this shank piece is not an insole nor part of an insole but is similar to the shank piece ordinarily assembled in turned shoes. Unlike the shank piece in the usual turned shoe, however, the shank piece 30 is assembled over the last and the upper is lasted in relation to it whereas in conventional turns the shank is inserted after assembly of the upper with the sole and before second lasting.

The upper parts, comprising the upper material proper 41, its lining 42, the toe boxing 43, counter reinforcement etc., are prepared and assembled together in the usual manner and tack lasted to the shank piece and to the bottom of the last forward of the shank piece. Before lasting the upper, however, I apply a suitable elastic adhesive 44 between the lining and the upper over the forepart areas which are pulled over the last bottom, and between the toe boxing and the lining and upper at the assembly allowance of the toe portion. For this purpose I prefer to use rubber cement or latex. After the elastic adhesive has set, the lasting tacks are removed from the forepart and the surplus of the overlasted upper parts is trimmed away in the usual manner, as suggested in Figure 12.

I then abrade the inturned lasting allowance 45 by performing the roughing operation usual in preparing shoes for cement sole attaching and apply cement 38 to the assembly allowance and to the exposed areas of the shank piece. The roughing operation in effect skives the edge margin of the upper, as will be readily understood. The cement is permitted to dry and transverse slits 46—46 are formed in the lasting allowance 45 of the upper at the forward end of the shank piece and approximately at the ball line of the shoe. The upper lining and boxing at 45 forward of the transverse cuts, integrated by the elastic adhesive and reinforced by the cement 38 form a unitary rim which is then lifted away from the last as shown in Figures 13 and 14.

Sole assembly operations

Immediately before applying the sole to the shoe, a suitable solvent is applied to the cement 37—38, bringing it to the necessary tacky consistency. The forward edges of the sole leaf 33 are then presented under the rim 45 through the slits at 46 and the sole is slid forward in the direction of the arrows in Figures 15-16, until it is in proper position. It will be noted (Figure 13) that the slits 46 do not extend entirely across the lasting margin of the upper; however, no difficulty is experienced in inserting the sole as above inasmuch as the slits, coincident with the forward end of the shank piece 30, are located one in advance of the other and the rim 45 is raised from the last.

The shank and heel portions of the sole are then laid down, and pressure is applied over the entire sole area and maintained until the cement has set. The necessary even application of pressure is obtained by the use of a standard cement sole attaching machine, as will be readily understood. As the pressure is applied, the rim 45 and leaf 33 flatten down in interleafed relation substantially as shown in Figure 18, obtaining a smooth and seamless interior for the shoe, the edges of the leaf extending to the margins of the last and abutting the upper as does an insole in a welt or McKay shoe.

The shoe is completed by the usual operations of attaching the heel 50, removing the last and inserting the sock lining 51, as well as by the other usual trimming operations including the removal of any cement 37 adhering to the exposed edge margin of the sole.

Constructed as above described, the finished shoe embodies the outstanding virtues of a turned shoe, such as flexibility, fitting qualities, etc. Additional advantages are the improved shape holding qualities attained by reason of the support afforded the upper by the edges of the sole leaf 33, a smooth interior sole surface having no inseam channel nor after-inserted shank piece, and, importantly, a highly waterproof construction. In this connection it will be obvious that any ordinary break or rupture in the cemented joint will not permit leakage into the interior of the shoe.

The edge binding adhesive 44 is flexible and elastic, as well as waterproof, and rather less pyroxylin cement is used in the forepart of this construction than in cemented shoes characterized by skeleton insoles.

Figures 21 to 25 illustrate the same method steps heretofore taught to produce a substantially similar shoe or slipper in which the toe portion of the upper is not required to be reinforced by boxing material. The construction is therefore different only in that the boxing is not shown as part of the upper and the tip portion of the sole is not reduced as heretofore described and shown at 34 in Figure 7. In this modification the leaf 33 of the sole extends entirely around the forepart and the rim 45 of the upper is interleafed therewith about the toe tip as well as at the sides of the ball portion.

Figures 26-29 illustrate a modification of my invention involving a further operation in preparing the sole which results in a smoother junction of the parts in the finished shoe, particularly where heavy upper materials are employed.

So far as my invention is concerned with method, this modification relates entirely to the preparation of the sole, the upper being lasted, roughed and otherwise prepared in all respects as previously described. The sole is fitted as shown in Figure 7 to form the integral leaf 33 and, in addition, a rand 55, wedge shaped in cross section, is removed from the edge margin of the sole and from the surface underlying the leaf 33 to reduce or feather edge the sole and to provide an open channel 35' intermediate the leaf and the underlying sole portion, the channel being of a size and shape to accommodate the rim 45 of the upper which has been roughed to a skived edge, as heretofore described. In performing this operation, the randing knife 60 is not extended to the full breadth of the leaf 33 but is set to feather off the rand just short of the root of the leaf, as shown in Figure 26.

All the other operations described in connection with Figures 1-20 are performed to assemble a shoe as shown in Figure 29 in which the inner and outer surfaces of the sole are substantially parallel. Also, it will be apparent that the further randing operation obtaining this further structural advantage may be performed in connection with the making of the soft toed shoe or slipper shown in Figure 25.

Since disclosure of the foregoing in my application Serial No. 44,180, filed October 9, 1935, I have made valuable improvements which are particularly illustrated in Figures 30, 31, and 32.

When the sole is assembled with the lasted upper in the manner above set forth, I have found it necessary that the assembly operations be performed quite rapidly due to the fact that the cement 37—38 sets very quickly after application of the cement solvent. If the workman is highly practised in these operations, no difficulty arises but any appreciable delay is apt to permit a bond to be effected before the sole is properly positioned. It is the object of my present improvement, therefore, to provide ways and means whereby the sole may be accurately positioned relative to the upper before the solvent is applied to the cement.

In carrying out my improvement, the sole is prepared in all respects as heretofore described and the upper is prepared, lasted and trimmed as shown in Figure 13, except that I have found it unessential to form the slits or cuts 46 in the upper margin and now prefer to dispense with them. I then form a line of perforations 65 about the lasting margin of the upper forepart, preferably after the cement 38 has been applied and has congealed, the perforations being spaced as shown and extending through the upper 41, the adhesive 44 and the lining 42. The leaf 33 of the sole is then inserted under the rim 45 and the sole is oriented substantially to its proper bottoming position. In bringing these parts together, I have found no difficulty in tucking the flexible leaf 33 between the last and the pliable rim 45 where the rim is continuous as shown in Figure 30.

When the rim 45 has been smoothly interleafed between the sole portions, the cement solvent 70 is applied, as by a brush 71, between the cement carrying surface of the upper and the adjacent cement carrying portion of the sole. The solvent, being of low viscosity and high penetration, quickly flows over the surfaces to which it is applied and a part of it flows through the perforations 65 and over the underlying cemented surface of the sole leaf 33, bringing all the cement carrying surfaces to a proper tacky consistency. The sole forepart may then be trued and aligned with the last, solvent is applied to the cement 38 overlying the shankpiece 30 and the upper margins rearward of the ball line, and the sole is laid and levelled under pressure in a cement sole attaching machine as heretofore described, after which the shoe may be finished in the usual manner.

In applying pressure to the sole, a portion of the cement is squeezed into the cavities defined by the perforations 65, filling the cavities and forming a plurality of keys 72 which extend between the split portions of the sole thru the upper and assist in holding the parts firmly together in assembled relation.

I claim:

1. In methods of making cemented shoes wherein an upper is adhesively secured between portions of the sole, that improvement which comprises coating the sole portions with adhesive and permitting said adhesive to set, forming a plurality of perforations about the margin of the upper, bringing the parts together substantially in assembled relation, applying a fluid solvent for the adhesive between the upper and one of said sole portions, said solvent flowing thru the perforations and softening all the adhesive, and then pressing the parts together until the adhesive resets.

2. In shoemaking methods wherein a layer of material is cemented in interleafed relation between two other layers of material, that improvement which comprises coating facing surfaces of the several layers with cement and permitting the cement to set, forming a plurality of perforations thru the intermediate layer, bringing the layers together substantially in assembled relation, and then applying a fluid slovent for the cement between the uppermost and intermediate layers, said solvent flowing thru said perforations and between the intermediate and lower layers whereby all the cement is softened, and then pressing said layers together until the cement resets.

3. In shoemaking methods, that improvement which includes, lasting an upper and applying adhesive to the lasting margin thereof at the forepart to form a rim, forming a plurality of perforations thru the rim and moulding the rim away from the last; providing a rounded sole having a channel extending inwardly from its edge about the forepart thereof, applying adhesive to the walls of said channel and permitting said adhesive to set, positioning the rim in the channel of the sole substantially in assembled relation, applying a fluid solvent for the adhesive in said channel, and then pressing the parts together until the adhesive resets.

4. In shoemaking methods, that improvement which includes securing the lasting margin of an upper, including a lining, to a last and binding the lasting margins of the upper and lining together to form a rim, then releasing said rim from the last and moulding it away from the last, providing a rounded sole having a marginal leaf, then inserting said leaf under the rim whereby the rim is interleafed between the sole and said leaf with the upper margin in contact with the sole and the margin of the lining in contact with the leaf, and securing the sole to the shoe.

5. In shoemaking methods, that improvement which includes temporarily securing a shank piece to a last and lasting an upper to the shank piece and to the last forwardly of the shank piece, reinforcing the lasting margin of the upper forwardly of the shank piece with adhesive, then releasing said upper margin from the last, providing a rounded sole having a marginal leaf at the forepart thereof, then inserting the leaf under said upper margin and positioning the forepart of the sole whereby the upper margin is interleafed between the sole and the leaf in direct contacting relation with said leaf, then laying the shank and heel portion of the sole and securing the sole to the shoe.

6. In shoemaking methods, that improvement which includes: lasting an upper and reinforcing the lasting margin thereof at the forepart to form a pliable rim, forming transverse slits in the rim at or adjacent the ball line of the shoe and moulding the rim away from the last forwardly of said slits; providing a rounded sole having a marginal leaf at the forepart thereof, inserting said leaf under the rim through said slits and sliding the sole forwardly into position whereby the rim is interleafed between the sole and said leaf, then laying the sole rearwardly of the ball line thereof and securing it in position.

7. In shoemaking methods, that improvement which includes: lasting an upper and reinforcing the lasting margin thereof at the forepart to form a rim, forming transverse slits in the rim at or adjacent the ball line of the shoe and moulding the rim away from the last forwardly of said slits; providing a rounded sole having a marginal leaf at the forepart thereof, applying cement to the underside of said leaf and to the surfaces of the sole underlying said leaf and rearwardly thereof; inserting said leaf under the rim through said slits and sliding the sole forwardly into position whereby the rim is interleafed between the sole and said leaf, laying the sole rearwardly of the ball line thereof, and applying pressure over the entire sole area until said cement has set.

8. In shoemaking methods, that improvement which includes: lasting an upper and applying adhesive to the lasting margin thereof at the forepart to form a rim, forming transverse slits in the rim at or adjacent the ball line of the shoe and moulding the rim away from the last forwardly of said slits; providing a rounded sole having a marginal leaf at the forepart thereof, applying cement to the underside of said leaf and to the surfaces of the sole underlying said leaf and rearwardly thereof; inserting said leaf under the rim through said slits and sliding the sole forwardly into position whereby the rim is interleafed between the sole and said leaf, laying the sole rearwardly of the ball line thereof, and applying pressure over the entire sole area until said cement has set; attaching a heel and removing the last.

9. In shoemaking methods, that improvement which includes: temporarily securing a shank piece to a last and lasting an upper to the shank piece and to the bare last forwardly of the shank piece, reinforcing the lasting margin of the upper forwardly of the shank piece to provide a pliable forepart rim, and moulding said rim away from the last; providing a rounded sole reduced in thickness rearwardly of the ball line and having a marginal leaf at the forepart thereof, inserting said leaf under the rim whereby the rim is interleafed between the sole and said leaf, and securing the sole to the shoe.

10. In shoemaking methods, that improvement which includes: temporarily securing a shank piece to a last and lasting an upper to the shank piece and to the bare last forwardly of the shank piece, reinforcing the lasting margin of the upper forwardly of the shank piece to provide a pliable forepart rim, and moulding said rim away from the last; providing a rounded sole having a marginal leaf at the forepart thereof, applying cement to the underside of said leaf and to the surfaces of the sole underlying said leaf and rearwardly thereof; inserting the leaf under said rim and positioning the sole forepart whereby the rim is interleafed between the sole and the leaf, laying the sole rearwardly of said rim, and applying pressure over the entire sole area until said cement has set.

11. In shoemaking methods, that improvement which includes: temporarily securing a shank piece to a last and lasting an upper to the shank piece and to the last forwardly of the shank piece, applying elastic adhesive to reinforce the lasting margin of the upper forwardly of the shank piece and forming transverse slits in the upper margin at the forward end of the shank piece to define a pliable forepart rim, and moulding said rim away from the last; providing a rounded sole reduced in thickness rearwardly of the ball line and having a marginal leaf at the forepart thereof, applying cement to the underside of said leaf and to the surfaces of the sole underlying said leaf and rearwardly thereof; inserting said leaf under the rim through said slits and sliding the sole forwardly into position whereby the rim is interleafed between the sole and said leaf, laying the rearward portions of the sole, and applying pressure over the entire sole area until said cement has set; attaching a heel and removing the last.

12. In shoemaking methods, that improvement which comprises temporarily securing a shank piece to a last and lasting an upper to the shank piece and to the last forwardly of the shank piece, reinforcing the lasting margin of the upper forwardly of the shank piece to provide a pliable forepart rim and releasing said rim from the last, providing a rounded leather sole having flesh and grain surfaces, the sole being reduced at its flesh surface over the shank and toe areas and having integral lips at its flesh surface extending between said areas at opposite margins of the ball portion, then inserting said lips under the rim and positioning the forepart of the sole, then laying the shank and heel portion of the sole and securing the sole to said shank piece and to the lasting margin of the upper.

13. A rounded outsole of leather having flesh and grain surfaces, the outsole being reduced at its flesh surface over the shank and toe areas and having integral lips on its flesh side extending between said areas at opposite margins of the ball portion.

14. A shoe comprising an outsole reduced at its inner surface over the shank and toe areas and having integral lips at said inner surface extending between said areas at opposite margins of the ball portion, a shank piece overlying the shank and heel portion of the sole, and an upper, said upper being secured to the reduced surface of the outsole at the toe area, between the outsole and said lips at the ball portion, and between the outsole and said shank piece rearwardly of the ball portion.

FRED MACCARONE.